US011448110B2

(12) United States Patent
Xue et al.

(10) Patent No.: US 11,448,110 B2
(45) Date of Patent: Sep. 20, 2022

(54) SELECTIVE CATALYTIC REDUCTION ARTICLES AND SYSTEMS

(71) Applicant: BASF Corporation, Florham Park, NJ (US)

(72) Inventors: Wen-Mei Xue, Dayton, NJ (US); Jeff H. Yang, Glen Rock, NJ (US); Stanley A. Roth, Yardley, PA (US); Kenneth E. Voss, Somerville, NJ (US); Sandip D. Shah, East Brunswick, NJ (US); Jaya L. Mohanan, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/323,145

(22) PCT Filed: Aug. 4, 2017

(86) PCT No.: PCT/IB2017/054804
§ 371 (c)(1),
(2) Date: Feb. 4, 2019

(87) PCT Pub. No.: WO2018/025245
PCT Pub. Date: Feb. 8, 2018

(65) Prior Publication Data
US 2019/0170042 A1    Jun. 6, 2019

Related U.S. Application Data

(60) Provisional application No. 62/371,527, filed on Aug. 5, 2016.

(51) Int. Cl.
*F01N 3/20* (2006.01)
*B01J 29/072* (2006.01)
(Continued)

(52) U.S. Cl.
CPC ....... *F01N 3/2066* (2013.01); *B01D 53/9418* (2013.01); *B01D 53/9472* (2013.01); *B01J 29/005* (2013.01); *B01J 29/061* (2013.01); *B01J 29/068* (2013.01); *B01J 29/072* (2013.01); *B01J 29/54* (2013.01); *B01J 29/56* (2013.01); *B01J 29/72* (2013.01); *B01J 29/723* (2013.01); *B01J 29/74* (2013.01); *B01J 29/743* (2013.01); *B01J 29/76* (2013.01); *B01J 29/763* (2013.01); *B01J 29/80* (2013.01); *B01J 35/0006* (2013.01); *B01J 37/0246* (2013.01); *B01J 37/08* (2013.01); *F01N 3/20* (2013.01); *B01D 2255/20761* (2013.01); *B01D 2255/50* (2013.01); *B01D 2255/90* (2013.01); *B01D 2255/902* (2013.01);
(Continued)

(58) Field of Classification Search
CPC .. B01J 29/005; B01J 29/061; B01J 2029/062; B01J 29/068; B01J 29/072; B01J 29/80; B01J 29/763; B01J 29/723; B01J 29/743; B01J 29/72; B01J 29/54; B01J 29/56; B01J 29/74; B01J 29/76; B01J 37/08; B01J 37/0009; B01J 37/0201; B01J 37/0215; B01J 37/0246; B01J 37/0244; B01J 37/024; B01J 37/30; B01J 35/04; B01J 35/0006; Y02C 20/10; Y02T 10/12; F01N 2570/02; F01N 2570/14; F01N 3/2066; F01N 3/20; F01N 3/0222; F01N 3/0293; F01N 3/035; F01N 13/009; F01N 13/0093; F01N 13/0097; F01N 13/011; F01N 13/017; B01D 2258/012; B01D 2258/01; B01D 2257/402; B01D 2257/404; B01D 53/9418; B01D 53/9472; B01D 2255/902; B01D 2255/9032; B01D 2255/90; B01D 2255/905; B01D 2255/65; B01D 2255/9022; B01D 2255/9025; B01D 2255/903; B01D 2255/9037; B01D 2255/904; B01D 2255/9045; B01D 2255/20761; B01D 2255/9155
USPC ........ 502/60, 63, 64, 66, 67, 69, 74, 527.12, 502/527.13, 527.19, 527.24; 422/170, 422/171, 172, 177, 180
See application file for complete search history.

(56) References Cited

U.S. PATENT DOCUMENTS

| | | | |
|---|---|---|---|
| 5,024,981 A | 6/1991 | Speronello et al. |
| 5,516,497 A | 5/1996 | Speronello et al. |

(Continued)

FOREIGN PATENT DOCUMENTS

| | | |
|---|---|---|
| JP | H02-293022 A | 12/1990 |
| RU | 2405948 C2 | 12/2010 |

(Continued)

OTHER PUBLICATIONS

Russian Search Report for Russian Application No. 2019106043, dated Oct. 26, 2020 (2 pages).

(Continued)

*Primary Examiner* — Elizabeth D Wood
(74) *Attorney, Agent, or Firm* — Finnegan, Henderson, Farabow, Garrett & Dunner, LLP

(57) ABSTRACT

Certain selective catalytic reduction (SCR) articles, systems and methods provide for high NOx conversion while at the same time low $N_2O$ formation. The articles, systems and methods are suitable for instance for the treatment of exhaust gas of diesel engines. Certain articles have zoned coatings containing copper-containing molecular sieves disposed thereon, where for example a concentration of catalytic copper in an upstream zone is lower than the concentration of catalytic copper in a downstream zone.

27 Claims, 4 Drawing Sheets

(51) Int. Cl.
    *B01J 37/02*     (2006.01)
    *B01J 37/08*     (2006.01)
    *B01J 35/00*     (2006.01)
    *B01J 29/76*     (2006.01)
    *B01D 53/94*     (2006.01)
    *B01J 29/06*     (2006.01)
    *B01J 29/068*     (2006.01)
    *B01J 29/80*     (2006.01)
    *B01J 29/72*     (2006.01)
    *B01J 29/74*     (2006.01)
    *B01J 29/00*     (2006.01)
    *B01J 29/54*     (2006.01)
    *B01J 29/56*     (2006.01)
    *B01J 37/30*     (2006.01)

(52) U.S. Cl.
    CPC .. *B01D 2255/904* (2013.01); *B01D 2255/905* (2013.01); *B01D 2255/9022* (2013.01); *B01D 2255/9032* (2013.01); *B01D 2255/9045* (2013.01); *B01D 2255/9155* (2013.01); *B01D 2258/012* (2013.01); *B01J 37/024* (2013.01); *B01J 37/0215* (2013.01); *B01J 37/0244* (2013.01); *B01J 37/30* (2013.01); *B01J 2029/062* (2013.01); *B01J 2229/186* (2013.01); *F01N 2370/02* (2013.01); *F01N 2570/14* (2013.01); *Y02C 20/10* (2013.01); *Y02T 10/12* (2013.01)

(56) References Cited

U.S. PATENT DOCUMENTS

| | | |
|---|---|---|
| 8,171,727 B2 | 5/2012 | Doring |
| 8,735,311 B2 | 5/2014 | Bull et al. |
| 9,138,732 B2 | 9/2015 | Bull et al. |
| 9,162,218 B2 | 10/2015 | Bull et al. |
| 9,616,420 B2 | 4/2017 | Chandler et al. |
| 2011/0271664 A1 | 11/2011 | Boorse et al. |
| 2014/0112853 A1* | 4/2014 | Mohanan ............... B01J 29/70 423/213.5 |
| 2015/0098870 A1 | 4/2015 | Lambert et al. |
| 2015/0132206 A1* | 5/2015 | Bull ........................ B01J 35/04 423/213.7 |
| 2015/0352492 A1* | 12/2015 | Andersen ........... B01D 53/9436 423/237 |
| 2015/0367337 A1* | 12/2015 | Yang .................... B01J 37/0246 423/239.2 |
| 2016/0008759 A1* | 1/2016 | Sonntag ............. B01D 53/9472 423/239.1 |
| 2016/0038878 A1 | 2/2016 | Sonntag et al. |
| 2016/0045868 A1* | 2/2016 | Sonntag ................. B01J 21/06 423/213.2 |
| 2016/0101411 A1 | 4/2016 | Bull et al. |
| 2016/0101412 A1 | 4/2016 | Bull et al. |
| 2017/0209857 A1 | 7/2017 | Chandler et al. |

FOREIGN PATENT DOCUMENTS

| | | |
|---|---|---|
| RU | 2449834 C2 | 5/2012 |
| RU | 2586685 C2 | 6/2016 |
| WO | WO 2012170421 A1 | 12/2012 |
| WO | WO 2015/175921 A2 | 11/2015 |

OTHER PUBLICATIONS

Supplemental European Search Report in European Application No. 17836513, dated Jan. 28, 2020 (2 pages).
International Search Report for International Application No. PCT/IB2017/054804, dated Nov. 23, 2017 (3 pages).

\* cited by examiner

SELECTIVE CATALYTIC REDUCTION ARTICLES AND SYSTEMS

CROSS-REFERENCE TO RELATED APPLICATIONS

The present application is a U.S. National Stage of International Patent Application PCT/IB2017/054804 filed Aug. 4, 2017 and claims priority to U.S. Provisional Patent Application No. 62/371,527 filed Aug. 5, 2016. The disclosures of each of the applications noted above are incorporated herein by reference in their entirety.

The present invention is aimed at selective catalytic reduction (SCR) articles and systems suitable for use in treating exhaust of an internal combustion engine.

BACKGROUND

Molecular sieves such as zeolites are employed in the catalysis of certain chemical reactions for example the selective catalytic reduction (SCR) of nitrogen oxides with a reductant such as ammonia, urea or hydrocarbons. Zeolites are crystalline materials having rather uniform pore sizes which, depending upon the type of zeolite and the type and amount of cations included in the zeolite lattice, range from about 3 to about 25 angstroms in diameter. Zeolites having 8-ring pore openings and double-six ring secondary building units, particularly those having cage-like structures are of interest as SCR catalysts. Included in this category are zeolites having a chabazite (CHA) crystal structure, which are small pore zeolites with 8 member-ring pore openings (ca. 3.8 angstroms) accessible through its 3-dimensional porosity. A cage like structure results from the connection of double six-ring building units by 4 rings.

Catalysts employed in the SCR process ideally should be able to retain good catalytic activity over the wide range of temperature conditions of use, for example from about 150° C. to about 600° C. or higher, under hydrothermal conditions. Hydrothermal conditions are encountered in practice because water is a byproduct of fuel combustion and high temperature hydrothermal conditions occur in diesel exhaust applications, such as during the regeneration of a soot filter, a component of exhaust gas treatment systems used for the removal of carbonaceous particles.

The SCR process converts nitrogen oxides (NOx) to nitrogen ($N_2$) and water ($H_2O$). An undesired SCR byproduct is nitrous oxide ($N_2O$). Desired are improved articles, systems and processes to selectively convert NOx within internal combustion engine exhaust streams to $N_2$ while minimizing the formation of undesired $N_2O$. Undesired $N_2O$ formation may be observed as molar percent conversion of ($NO+NO_2$) to $N_2O$.

Nitrogen oxides (NOx) may include $N_2O$, NO, $N_2O_3$, $NO_2$, $N_2O_4$, $N_2O_5$ or $NO_3$.

SUMMARY

In one or more embodiments, the present disclosure provides catalytic articles, systems and methods for treating exhaust gas streams containing nitrogen oxides. The articles, systems and methods will exhibit high NOx conversion while at the same time minimize $N_2O$ formation. In certain embodiments, the articles, systems and methods are suitable for treating lean exhaust gas streams of diesel internal combustion engines.

In one or more embodiments, the present disclosure relates to selective catalytic reduction articles, systems incorporating such articles, and methods utilizing such articles and systems. The selective catalytic reduction articles advantageously provide for high NOx conversion with simultaneously low formation of $N_2O$ because of the utilization of at least two different catalytically active molecular sieves. More specifically, at least a first copper-containing molecular sieve and a second copper-containing molecular sieve are utilized. The copper-containing molecular sieves are coated on at least one substrate. For example, a first coating layer of the first copper-containing molecular sieve and a second coating layer of the second copper-containing molecular sieve are coated on the at least one substrate. The first and second coating layers can be coated on the same substrate or on different substrates. For example, a first substrate can have the first coating layer with the first copper-containing molecular sieve provided thereon (e.g., in the form of a washcoat), and a second substrate can have the second coating layer with the second copper-containing molecular sieve provided thereon (e.g., in the form of a washcoat). Preferably, the first substrate with the first coating layer is provided upstream of the second substrate with the second coating layer relative to the flow path of an exhaust stream (the second substrate with the second coating layer thus being downstream of the first substrate with the first coating layer). Also preferably, the first copper-containing molecular sieve in the first coating layer in such configuration will have a copper concentration that is lower than a copper concentration of the second copper-containing molecular sieve in the second coating layer. The coating layers thus differ because of the differing copper concentrations. As another example, a substrate can have a first coating layer with a first copper-containing molecular sieve provided thereon (e.g., in the form of a washcoat), and the same substrate can have a second coating layer with the second copper-containing molecular sieve provided thereon (e.g., in the form of a washcoat). In such configuration, the second coating layer is preferably provided downstream of the first coating layer relative to the flow path of an exhaust stream (the first coating layer thus being upstream from the second coating layer). Also preferably, the first copper-containing molecular sieve in the first coating layer in such configuration will have a copper concentration that is lower than a copper concentration of the second copper-containing molecular sieve in the second coating layer. The substrate is thus zoned so that a first zone includes the first coating layer and the second zone includes the second coating layer. The zones (and thus the coating layers) may overlap if desired or may be non-overlapping. It has been found that providing a first copper-containing molecular sieve with a first copper concentration and a second copper-containing molecular sieve with a second, higher copper concentration beneficially achieves the results described herein in relation to NOx conversion and low $N_2O$ formation, particularly when the first copper-containing molecular sieve with the lower copper concentration is positioned upstream from the second copper-containing molecular sieve with the higher copper concentration. The present disclosure particularly provides, in some embodiments, a selective catalytic reduction article comprising a substrate having a front upstream end and a rear downstream end defining an axial length and having a catalytic coating thereon, where the catalytic coating comprises a first coating layer comprising a first copper-containing molecular sieve and a second coating layer comprising a second copper-containing molecular sieve.

Advantageously, the article is zoned and comprises a first upstream zone comprising the first coating layer comprising the first copper-containing molecular sieve and a second downstream zone comprising the second coating layer comprising the second copper-containing molecular sieve.

The concentration of copper in the upstream zone may be less than or equal to the concentration of copper in the downstream zone and/or the first molecular sieve may contain less copper than the second molecular sieve and/or the concentration of the copper-containing molecular sieve in the upstream zone may be less than or equal to the concentration of the copper-containing molecular sieve in the downstream zone.

Also disclosed are selective catalytic reduction systems comprising a first selective catalytic reduction article comprising a first substrate comprising the first catalytic coating layer comprising the first copper-containing molecular sieve and a second selective catalytic reduction article comprising a second substrate comprising the second catalytic coating layer comprising the second copper-containing molecular sieve, where the first and second articles are in fluid communication and where for example the second article is downstream of the first article.

Also disclosed are selective catalytic reduction articles or systems capable of providing NOx conversion of ≥90% (preferably ≥99%) and $N_2O$ formation of ≤50% (preferably ≤40%) of that of an article or system, respectively, containing a uniform concentration of CuCHA as the only SCR catalyst under transient engine testing conditions. More particularly, selective catalytic reduction articles, systems, or methods of the present disclosure can be configured for providing >90% NOx conversion while also providing 40% $N_2O$ formation, particularly when compared to an article, system, or method containing or employing a uniform concentration of high Cu-containing CuCHA as the only SCR catalyst under transient engine testing conditions as otherwise described herein. Embodiments of the present disclosure also relate to improved performance by utilizing zoning. For example, a selective catalytic reduction article, system, or method according to the present disclosure can include a substrate with a front upstream zone including a catalytic coating and a second downstream zone including a catalytic coating, and can be adapted for providing >90% total NOx conversion, particularly wherein the front upstream zone provides from about 30% to about 80% of the total NOx conversion.

Also disclosed are exhaust gas treatment systems comprising the preceding SCR articles or SCR systems.

Also disclosed are methods for treating exhaust streams containing NOx, the methods comprising passing the exhaust stream through the preceding SCR article, SCR system or exhaust gas treatment system.

The present articles, systems and methods are in particular suitable for the treatment of exhaust generated from diesel engines, which operate at combustion conditions with air in excess of that required for stoichiometric combustion, i.e., lean.

The invention includes, without limitation, the following embodiments.

Embodiment 1: A selective catalytic reduction article comprising a substrate having a front upstream end and a rear downstream end defining an axial length of the substrate and having a catalytic coating thereon, wherein the catalytic coating comprises: a first coating layer comprising a first copper-containing molecular sieve; and a second, different coating layer comprising a second copper-containing molecular sieve.

Embodiment 2: The selective catalytic reduction article of any preceding or subsequent embodiment, wherein the catalytic coating is zoned and comprises: a first zone proximate to the front upstream end of the substrate, the first zone including the first coating layer comprising the first copper-containing molecular sieve; and a second zone proximate to the rear downstream end of the substrate, the second zone including the second coating layer comprising the second, different copper-containing molecular sieve.

Embodiment 3: The selective catalytic reduction article of any preceding or subsequent embodiment, wherein the first copper-containing molecular sieve in the first zone has a copper concentration that is less than or equal a copper concentration of the second, different copper-containing molecular sieve in the second zone.

Embodiment 4: The selective catalytic reduction article of any preceding or subsequent embodiment, wherein the substrate is a porous wall-flow filter or a flow-through monolith.

Embodiment 5: The selective catalytic reduction article of any preceding or subsequent embodiment, wherein the first copper-containing molecular sieve comprises copper oxide in an amount of about 0.1 to about 4 wt %, and the second copper-containing molecular sieve comprises copper oxide in an amount of about 3 to about 10 wt %, based on the total weight of the molecular sieve.

Embodiment 6: The selective catalytic reduction article of any preceding or subsequent embodiment, wherein the first copper-containing molecular sieve comprises copper oxide in an amount of about 1 to about 2.5 wt %, and the second copper-containing molecular sieve comprises copper oxide in an amount of about 3 to about 6 wt %, based on the total weight of the molecular sieve.

Embodiment 7: The selective catalytic reduction article of any preceding or subsequent embodiment, wherein a Cu/Al atomic ratio for each of the first copper-containing molecular sieve and the second copper-containing molecular sieve is independently about 0.05 to about 0.55, and wherein the Cu/Al atomic ratio of the first copper-containing molecular sieve is less than the Cu/Al atomic ratio of the second copper-containing molecular sieve.

Embodiment 8: The selective catalytic reduction article of any preceding or subsequent embodiment, wherein the first coating layer extends a distance from the front, upstream end of the substrate towards the rear, downstream end of the substrate and overlays a portion of the second coating layer, which extends from the rear, downstream end of the substrate a distance towards the front, upstream end of the substrate.

Embodiment 9: The selective catalytic reduction article of any preceding or subsequent embodiment, wherein the first coating layer extends a from the front, upstream end of the substrate to the rear, downstream end of the substrate and overlays an entirety of the second coating layer, which extends from the rear, downstream end of the substrate to the front, upstream end of the substrate.

Embodiment 10: The selective catalytic reduction article of any preceding or subsequent embodiment, wherein the second coating layer extends a distance from the front, upstream end of the substrate towards the rear, downstream end of the substrate and overlays a portion of the first coating layer, which extends a distance from the rear, downstream end of the substrate towards the front, upstream end of the substrate.

Embodiment 11: The selective catalytic reduction article of any preceding or subsequent embodiment, wherein the second coating layer extends from the front, upstream end of the substrate to the rear, downstream end of the substrate and overlays an entirety of the first coating layer, which extends from the rear, downstream end of the substrate to the front, upstream end of the substrate.

Embodiment 12: The selective catalytic reduction article of any preceding or subsequent embodiment, wherein the first coating layer and the second coating layer are adjacent and do not overlay each other.

Embodiment 13: The selective catalytic reduction article of any preceding or subsequent embodiment, wherein the first coating layer and the second coating layer are in direct contact with each other.

Embodiment 14: The selective catalytic reduction article of any preceding or subsequent embodiment, wherein the first copper-containing molecular sieve and the second copper-containing molecular sieves are each 8-ring small pore molecular sieves.

Embodiment 15: The selective catalytic reduction article of any preceding or subsequent embodiment, wherein the first copper-containing molecular sieve and the second copper-containing molecular sieve are both independently zeolites having a structure selected from the group consisting of AEI, AFT, AFX, CHA, EAB, ERI, KFI, LEV, SAS, SAT and SAV.

Embodiment 16: The selective catalytic reduction article of any preceding or subsequent embodiment, wherein each of the first copper-containing molecular sieve and the second copper-containing molecular sieve have a CHA crystal structure.

Embodiment 17: The selective catalytic reduction article of any preceding or subsequent embodiment, wherein each of the first copper-containing molecular sieve and the second copper-containing molecular sieve are aluminosilicate zeolites having a CHA crystal structure and a silica to alumina ratio (SAR) of about 5 to about 40.

Embodiment 18: The selective catalytic reduction article of any preceding or subsequent embodiment, wherein the substrate includes an undercoat comprising an AMOx catalyst in the second zone.

Embodiment 19: A selective catalytic reduction system comprising: a first selective catalytic reduction article comprising a first substrate including a first catalytic coating layer comprising a first copper-containing molecular sieve having a first amount of copper oxide; and a second selective catalytic reduction article comprising a second substrate including a second catalytic coating layer comprising a second copper-containing molecular sieve having a second amount of copper oxide that is greater than the first amount of copper oxide; wherein the first selective catalytic reduction article and the second selective catalytic reduction article are in fluid communication.

Embodiment 20: The selective catalytic reduction system of any preceding or subsequent embodiment, wherein the first substrate of the first selective catalytic reduction article is zoned so as to include a first catalytic coating layer with a first copper concentration and a second cocatalyst layer with a second copper concentration that is higher than the first copper concentration.

Embodiment 21: The selective catalytic reduction system of any preceding or subsequent embodiment, wherein the first substrate and the second substrate are each independently selected from the group consisting of a porous wall-flow filter and a flow-through monolith.

Embodiment 22: The selective catalytic reduction system of any preceding or subsequent embodiment, wherein the second substrate includes an undercoat comprising an AMOx catalyst.

Embodiment 23: An exhaust gas treatment system comprising: a selective catalytic reduction article or a selective catalytic reduction system according to any preceding or subsequent embodiment; and a reductant injector in fluid communication with and upstream of the selective catalytic reduction article or the selective catalytic reduction system.

Embodiment 24: The exhaust gas treatment system of any preceding or subsequent embodiment, further comprising one or more of a diesel oxidation catalyst, a soot filter, and an ammonia oxidation catalyst.

Embodiment 25: The exhaust gas treatment system of any preceding or subsequent embodiment, further comprising an internal combustion engine in fluid communication with and upstream of the selective catalytic reduction article or the selective catalytic reduction system.

Embodiment 26: A method for treating an exhaust stream containing NOx, comprising passing the exhaust stream through a selective catalytic reduction article, a selective catalytic reduction system, or an exhaust gas treatment system of any preceding or subsequent embodiment.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DISCLOSURE

Figure 1:
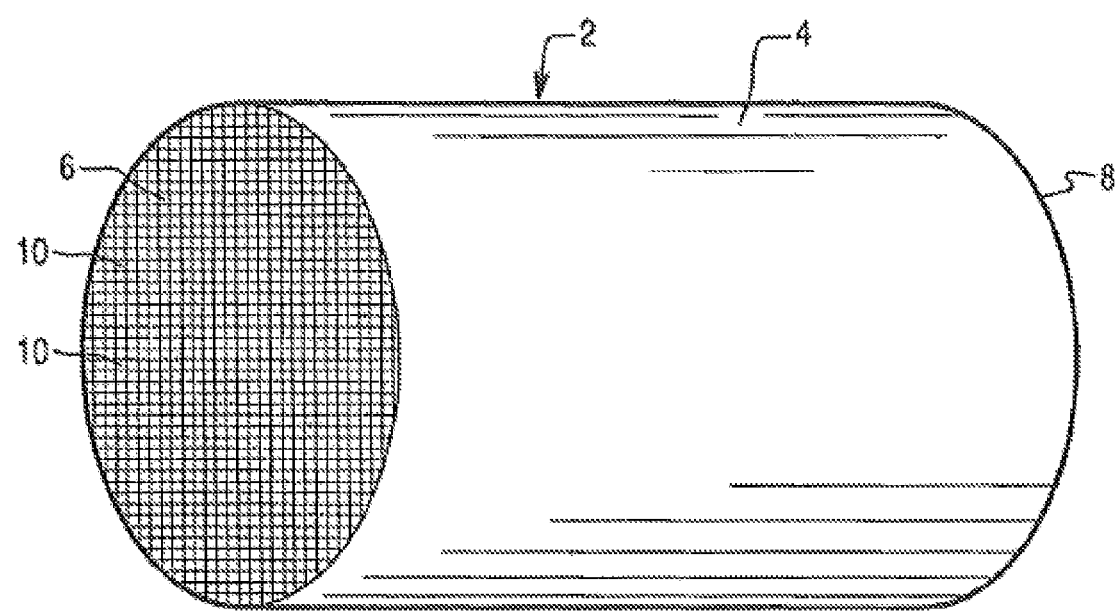
FIG. 1 is a perspective view of a honeycomb-type substrate carrier which may comprise a catalyst article in the form of a washcoat composition in accordance with the present invention.

Molecular sieves refer to materials having an extensive three-dimensional network of oxygen ions containing generally tetrahedral type sites and having a pore distribution of relatively uniform pore size. A zeolite is a specific example of a molecular sieve, further including silicon and aluminum. Reference to a "non-zeolite-support" or "non-zeolitic support" in a catalyst layer refers to a material that is not a zeolite and that receives precious metals, stabilizers, promoters, binders and the like through association, dispersion, impregnation or other suitable methods. Examples of such non-zeolitic supports include, but are not limited to, high surface area refractory metal oxides. High surface area refractory metal oxide supports can comprise an activated compound selected from the group consisting of alumina, zirconia, silica, titania, ceria, lanthana, baria and combinations thereof.

Present molecular sieves for instance have 8-ring pore openings and double-six ring secondary building units, for example, those having the following structure types: AEI, AFT, AFX, CHA, EAB, ERI, KFI, LEV, SAS, SAT or SAV. Included are any and all isotopic framework materials such as SAPO, AlPO and MeAPO materials having the same structure type.

Aluminosilicate zeolite structures do not include phosphorus or other metals isomorphically substituted in the framework. That is, "aluminosilicate zeolite" excludes aluminophosphate materials such as SAPO, AlPO and MeAPO materials, while the broader term "zeolite" includes aluminosilicates and aluminophosphates.

The 8-ring small pore molecular sieves include aluminosilicates, borosilicates, gallosilicates, MeAPSOs and MeAPOs. These include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44 and CuSAPO-47. In specific embodiments, the 8-ring small pore molecular sieve will have an aluminosilicate composition, such as SSZ-13 and SSZ-62.

In one or more embodiments, the 8-ring small pore molecular sieve has the CHA crystal structure and is selected from the group is consisting of aluminosilicate zeolite having the CHA crystal structure, SAPO, AlPO, and MeAPO. In particular, the 8-ring small pore molecular sieve having the CHA crystal structure is an aluminosilicate zeolite having the CHA crystal structure. In a specific embodiment, the 8-ring small pore molecular sieve having the CHA crystal structure will have an aluminosilicate composition, such as SSZ-13 and SSZ-62. Copper-containing chabazite is abbreviated as CuCHA.

Molecular sieves can be zeolitic (zeolites) or may be non-zeolitic. Both zeolitic and non-zeolitic molecular sieves can have the chabazite crystal structure, which is also referred to as the CHA structure by the International Zeolite Association. Zeolitic chabazite include a naturally occurring tectosilicate mineral of a zeolite group with approximate formula $(Ca,Na_2,K_2,Mg)Al_2Si_4O_{12}.6H_2O$ (i.e., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et. Al.; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538. Synthesis of a synthetic form of a non-zeolitic molecular sieve having the chabazite crystal structure, silicoaluminophosphate 34 (SAPO-34), is described in U.S. Pat. Nos. 4,440,871, 7,264,789. A method of making yet another synthetic non-zeolitic molecular sieve having chabazite structure, SAPO-44, is described for instance in U.S. Pat. No. 6,162,415.

A synthetic 8-ring small pore molecular sieve (for example having the CHA structure) may be prepared via mixing a source of silica, a source of alumina and a structure directing agent under alkaline aqueous conditions. Typical silica sources include various types of fumed silica, precipitated silica and colloidal silica, as well as silicon alkoxides. Typical alumina sources include boehmites, pseudo-boehmites, aluminum hydroxides, aluminum salts such as aluminum sulfite or sodium aluminate and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 100° C. to about 200° C., for instance from about 135° C. to about 170° C. Typical reaction times are from about 1 hr to about 30 days and in specific embodiments, for instance from 10 hours to 3 days. At the conclusion of the reaction, optionally the pH is adjusted to from about 6 to about 10, for example from about 7 to about 7.5 and the product is filtered and washed with water. Any acid can be used for pH adjustment, for instance nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C.

Molecular sieves having a CHA structure may be prepared for instance according to methods disclosed in U.S. Pat. Nos. 4,544,538 and 6,709,644.

The first and second molecular sieves may each have a silica to alumina ratio (SAR) of from 1 to about 50 or about 5 to about 40.

The present molecular sieves are copper-containing. The copper resides in the ion-exchange sites (pores) of the molecular sieves and may also be associated with the molecular sieves but not "in" the pores. Upon calcination, non-exchanged copper salt decomposes to CuO, also referred to herein as "free copper" or "soluble copper." The free copper may be advantageous as disclosed in U.S. Pat. No. 8,404,203. The amount of free copper may be less than, equal to or greater than the amount of ion-exchanged copper. All copper associated with a molecular sieve is part of any copper-containing molecular sieve.

The copper-containing molecular sieves are prepared for example via ion-exchange from for example a $Na^+$ containing molecular sieve ($Na^+$ form). The $Na^+$ form generally refers to the calcined form without any ion exchange. In this form, the molecular sieve generally contains a mixture of $Na^+$ and $H^+$ cations in the exchange sites. The fraction of sites occupied by $Na^+$ cations varies depending on the specific zeolite batch and recipe. Optionally, the alkali metal molecular sieves are $NH_4^+$-exchanged and the $NH_4^+$ form is employed for ion-exchange with copper. Optionally, the $NH4^+$-exchanged molecular sieve is calcined to the $H^+$-form which may also be employed for ion-exchange with copper.

Copper is ion-exchanged into molecular sieves with alkali metal, $NH_4^+$ or $H^+$ forms with copper salts such as copper acetate, copper sulfate and the like, for example as disclosed in U.S. Pat. No. 9,242,238. For instance, a $Na^+$, $NH_4^+$ or $H^+$ form of a molecular sieve is mixed with an aqueous salt solution and agitated at an elevated temperature for a suitable time. The slurry is filtered and the filter cake is washed and dried.

Further, at least a portion of a catalytically active metal may be included during a molecular sieve synthetic process such that a tailored colloid contains a structure directing agent, a silica source, an alumina source and a metal ion (e.g. copper) source.

The amount of copper in the molecular sieves can be about 0.1 to about 10 wt %. Advantageously, the amount of copper in the first molecular sieve can be less than the amount of copper in the second molecular sieve.

In some embodiments, the first molecular sieve can be a low copper molecular sieve in that it has a lower copper concentration than the second molecular sieve. Likewise, the second molecular sieve can be a high copper molecular sieve in that it has a higher copper concentration than the first molecular sieve. For example, a low copper molecular sieve or a low copper zone, or a low copper layer can have a copper concentration of about 2.5 wt % or less (e.g., about 0.5 to about 2.5 wt %, about 1 to about 2.5 wt %, or about 2 to about 2.5 wt %). In further embodiments, a low copper molecular sieve or a low copper zone, or a low copper layer can have a copper concentration of about 0.1 to about 4 wt % or about 0.3 to about 3 wt %. As a further example, a high copper molecular sieve or a high copper zone, or a high copper layer can have a copper concentration of about 3 wt % or greater (e.g., about 3 to about 10 wt %, about 3 to about 8 wt %, about 3 to about 6 wt %, or about 3 to about 4 wt %).

Amounts of copper in a molecular sieve are reported as the oxide, CuO.

The total dry weight of the molecular sieve includes the any added/exchanged metals like copper.

The amount of copper in a molecular sieve, for example an aluminosilicate zeolite, may also be defined by the copper to aluminum atomic ratio. For example, the Cu/Al atomic ratio for the present molecular sieves may be from about 0.05 to about 0.55. Advantageously, the atomic ratio of Cu to Al in the first molecular sieve is less than that of the second molecular sieve.

The molecular sieves of the upstream and downstream zones may be the same or may be different. For instance, they may be the same or different regarding their SAR. For example, the first molecular sieve may have a SAR lower than, equal to or greater than the SAR of the second molecular sieve.

The 8-ring small pore molecular sieves containing copper may each have a sodium content (reported as $Na_2O$ on a volatile free basis) of below 2 wt %, based on the total weight of the calcined molecular sieve. In more specific embodiments, sodium content is below 1 wt % or below 2500 ppm. The molecular sieves may each have an atomic sodium to aluminum ratio of less than about 0.7, for example from about 0.02 to about 0.7. The molecular sieves may each have an atomic copper to sodium ratio of greater than about 0.5, for example from about 0.5 to about 50.

The present copper-containing molecular sieves may exhibit a BET surface area, determined according to DIN 66131, of at least about 400 $m^2/g$, at least about 550 $m^2/g$ or at least about 650 $m^2/g$, for example from about 400 to about 750 $m^2/g$ or from about 500 to about 750 $m^2/g$. The present molecular sieves may have a mean crystal size of from about 10 nanometers to about 10 microns, from about 50 nanometers to about 5 microns or from about 0.1 microns to about 0.5 microns as determined via SEM. For instance, the molecular sieve crystallites may have a mean crystal size greater than 0.1 microns or 1 micron and less than 5 microns.

The molecular sieves may be provided in the form of a powder or a spray-dried material which is admixed with or coated with suitable modifiers. Modifiers include silica, alumina, titania, zirconia and refractory metal oxide binders (for example a zirconium precursor). The powder or the sprayed material, optionally after admixing or coating by suitable modifiers, may be formed into a slurry, for example with water, which is deposited upon a suitable substrate as disclosed for example in U.S. Pat. No. 8,404,203.

The term "catalyst" refers to a material that promotes a chemical reaction. The catalyst includes the "catalytically active species" and the "carrier" that carries or supports the active species. For example, molecular sieves including zeolites are carriers/supports for present copper active catalytic species. Likewise, refractory metal oxide particles may be a carrier for platinum group metal catalytic species.

The catalytically active species are also termed "promoters" as they promote chemical reactions. For instance, the present copper-containing molecular sieves may be termed copper-promoted molecular sieves. A "promoted molecular sieve" refers to a molecular sieve to which catalytically active species are intentionally added.

Selective catalytic reduction (SCR) of nitrogen oxides (NOx) means selective reduction to $N_2$.

The term "substrate" refers in general to a monolithic material onto which a catalytic coating is disposed, for example a flow-through monolith or monolithic wall-flow filter. In one or more embodiments, the substrate is a ceramic or metal having a honeycomb structure. Any suitable substrate may be employed, such as a monolithic substrate of the type having fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the monolithic substrate are thin-walled channels, which can be of any suitable cross-sectional shape and size such as trapezoidal, rectangular, square, sinusoidal, hexagonal, triangular, etc. Such structures may contain from about 60 to about 900 or more gas inlet openings (i.e. cells) per square inch of cross-section.

Present substrates are 3-dimensional having a length and a diameter and a volume, similar to a cylinder. The shape does not necessarily have to conform to a cylinder. The length is an axial length defined by an inlet end and an outlet end.

Flow-through monolith substrates for example have a volume of from about 50 $in^3$ to about 1200 $in^3$, a cell density of from about 60 cells per square inch (cpsi) to about 500 cpsi or up to about 900 cpsi, for example from about 200 to about 400 cpsi and a wall thickness of from about 50 to about 200 microns or about 400 microns.

The substrate may be a "flow-through" monolith as described above. Alternatively, a catalytic coating may be disposed on a wall-flow filter soot filter, thus producing a Catalyzed Soot Filter (CSF). If a wall-flow substrate is utilized, the resulting system will be able to remove particulate matter along with gaseous pollutants. The wall-flow filter substrate can be made from materials commonly known in the art, such as cordierite, aluminum titanate or silicon carbide. Loading of the catalytic coating on a wall-flow substrate will depend on substrate properties such as porosity and wall thickness and typically will be lower than the catalyst loading on a flow-through substrate.

Wall-flow filter substrates useful for supporting the SCR catalytic coatings have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross-section, although far fewer may be used. For example, the typical carrier usually has from about 100 to about 300, cells per square inch ("cpsi"). The cells can have cross-sections that are rectangular, square, triangular, hexagonal, or are of other polygonal shapes. Wall-flow substrates typically have a wall thickness from about 50 microns to about 500 microns, for example from about 150 microns to about 400 microns. Wall-flow filters will generally have a wall porosity of at least 40% with an average pore size of at least 10 microns prior to disposition of the catalytic coating. For instance, wall-flow filters will have a wall porosity of from about 50 to about 75% and an average pore size of from about 10 to about 30 microns prior to disposition of a catalytic coating.

Figure 2:
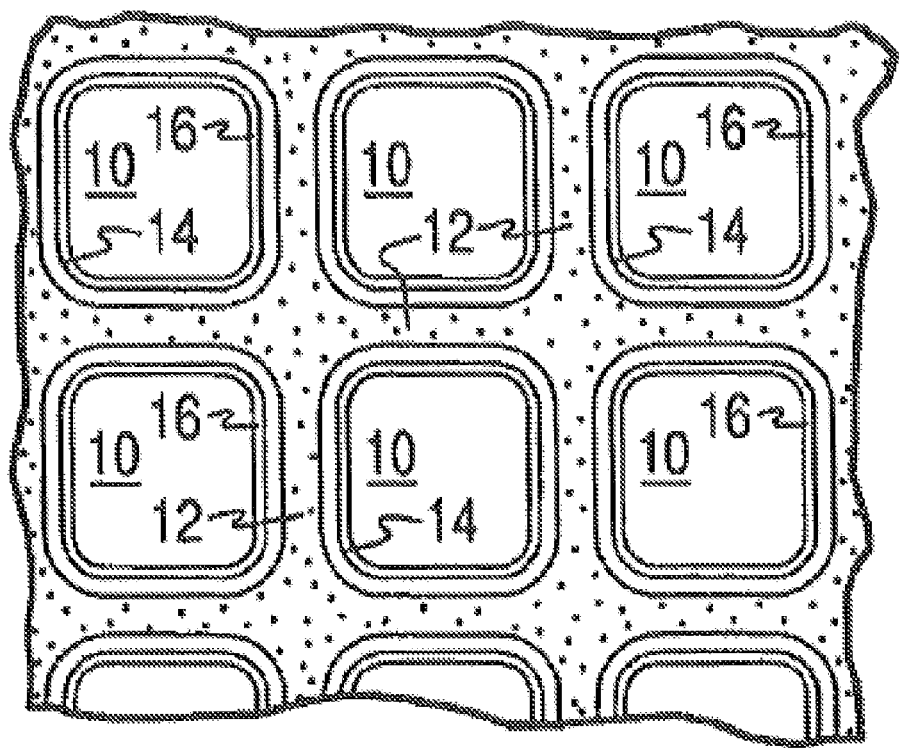
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1, in an embodiment wherein the substrate carrier is a monolithic flow-through substrate.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
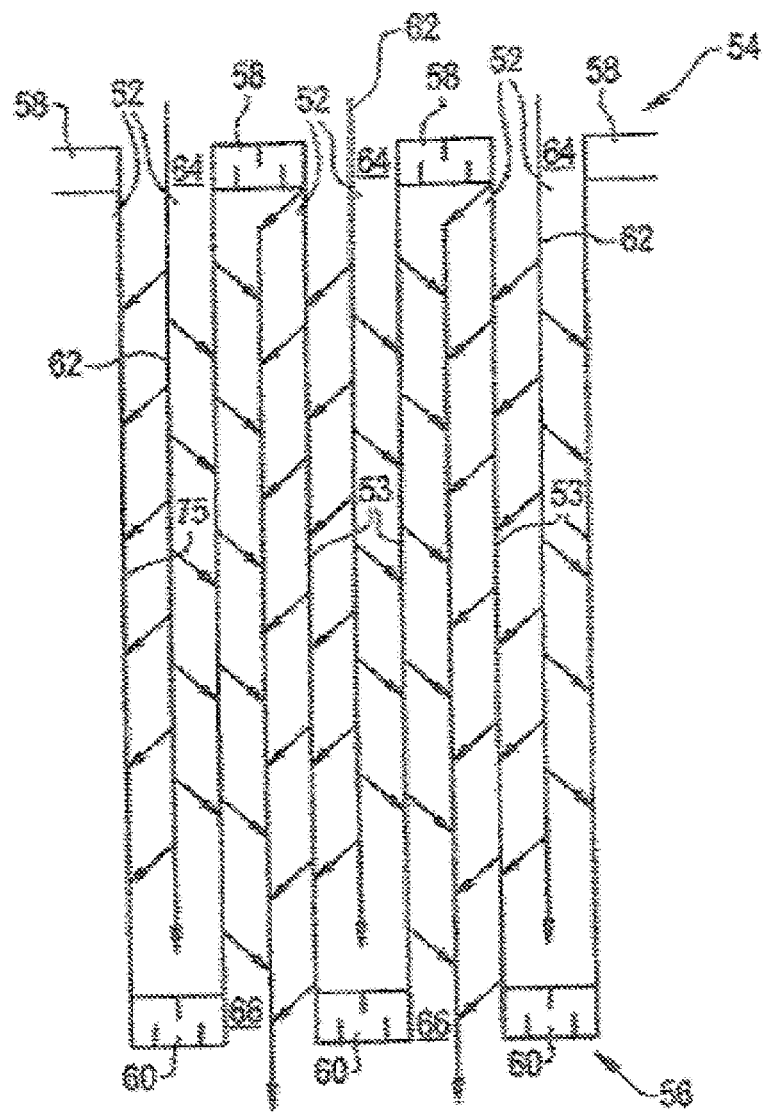
FIG. 3 is a cutaway view of a section enlarged relative to FIG. 1, wherein the honeycomb-type substrate carrier in FIG. 1 represents a wall flow filter substrate monolith.

Alternatively, FIGS. 1 and 3 can illustrate an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

Catalyzed wall-flow filters are disclosed for instance in U.S. Pat. No. 7,229,597. This reference teaches a method of applying a catalytic coating such that the coating permeates the porous walls, that is, is dispersed throughout the walls. Flow-through and wall-flow substrates are also taught for example in U.S. Pat. app. No. 62/072,687, published as WO2016/070090.

For example, in the present systems the first substrate is a porous wall-flow filter and the second substrate is a flow-through monolith or alternatively, the first substrate is a flow-through monolith and the second substrate is a porous wall-flow filter. Alternatively, both substrates may be identical and may be flow-through or wall-flow substrates.

The present catalytic coating may be on the wall surface and/or in the pores of the walls, that is "in" and/or "on" the filter walls. Thus, the phrase "having a catalytic coating thereon" means on any surface, for example on a wall surface and/or on a pore surface.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen.

Certain embodiments pertain to the use of articles, systems and methods for removing NOx from exhaust gases of internal combustion engines, in particular diesel engines, which operate at combustion conditions with air in excess of that required for stoichiometric combustion, i.e. lean conditions.

The inlet end of a substrate is synonymous with the "upstream" end or "front" end. The outlet end is synonymous with the "downstream" end or "rear" end. A substrate will have a length and a width. An upstream zone is upstream of a downstream zone. A zone of a catalyzed substrate is defined as a cross-section having a certain coating structure thereon.

In the present exhaust gas treatment methods, the exhaust gas stream is passed through the SCR article, SCR system or exhaust gas treatment system by entering the upstream end and exiting the downstream end.

The ceramic substrate may be made of any suitable refractory material, e.g. cordierite, cordierite-α-alumina, aluminum titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates useful in the present invention may also be metallic, comprising one or more metals or metal alloys. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt % of aluminum, and from 0 to about 20 wt % of nickel.

A catalytic coating contains one or more carriers containing active catalytic species. A catalytic coating may typically be applied in the form of a washcoat containing carriers having catalytically active species thereon. A washcoat is formed by preparing a slurry containing a specified solids content (e.g., 10-60% by weight) of carriers in a liquid vehicle, which is then coated onto a substrate and dried and calcined to provide a coating layer. When multiple coating layers are applied, the substrate is dried and calcined after each layer is applied and/or after the number of desired multiple layers are applied.

Coating layers of molecular sieves may be prepared using a binder, for example, a $ZrO_2$ binder derived from a suitable precursor such as zirconyl acetate or any other suitable zirconium precursor such as zirconyl nitrate. Zirconyl acetate binder provides a catalytic coating that remains homogeneous and intact after thermal aging, for example, when the catalyst is exposed to high temperatures of at least about 600° C., for example, about 800° C. and higher, and high water vapor environments of about 10% or more. Other potentially suitable binders include, but are not limited to, alumina and silica. Alumina binders include aluminum oxides, aluminum hydroxides, and aluminum oxyhydroxides. Aluminum salts and colloidal forms of alumina many also be used. Silica binders include various forms of $SiO_2$, including colloidal silica. Binder compositions may include any combination of zirconia, alumina, and silica.

Any of present coating layers may contain $ZrO_2$ binder and/or $Al_2O_3$.

The catalytic coating may comprise more than one thin adherent layer. The coating is disposed on and in adherence to the substrate. The entire coating comprises the individual "coating layers". The catalytic coating is "zoned", comprising zoned catalyst layers. This may also be described as "laterally zoned". For example, a first layer may extend from the inlet end towards the outlet end extending about 5% to about 100%, about 10% to about 90%, or about 20% to about 50% of the substrate length. A second layer may extend from the outlet end towards the inlet end extending about 5% to about 100%, about 10% to about 90%, or about 20% to about 50% of the substrate length. The first and second layers may be adjacent to each other and not overlay each other. Alternatively, the first and second layers may overlay a portion of each other, providing a third "middle" zone. The middle zone may for example extend from about 5% to about 80% of the substrate length. Alternatively, the first layer may extend from the outlet end and the second layer may extend from the inlet end.

The first and second layers may each extend the entire length of the substrate or may each extend a portion of the length of the substrate and may overlay or underlay each other, either partially or entirely. Each of the first and second layers may extend from either the inlet or outlet end.

The first coating layer may extend the entire length of the substrate and the second coating layer may overlay or underlay a portion or all of the first layer. For example, the second coating layer may extend from the outlet end towards the inlet end about 10% to about 80% of the substrate length.

The second coating layer may extend the entire length of the substrate and the first coating layer may overlay or underlay a portion or all of the second layer. For example, the first coating layer may extend from the inlet end towards the outlet end about 10% to about 80% of the substrate length.

The present zones are defined by the relationship of the first and second coating layers. With respect to the first and second coating layers, there may only an upstream and a downstream zone or there may be an upstream zone, a middle zone and a downstream zone. Where the first and second layers are adjacent and do not overlap, there are only upstream and downstream zones. Where the first and second layers overlap to a certain degree, there are upstream, downstream and middle zones. Where for example, a first coating layer extends the entire length of the substrate and the second coating layer extends from the outlet end a certain length and overlays a portion of the first coating layer, there are only upstream and downstream zones.

The first and/or second coating layers may be in direct contact with the substrate. Alternatively, one or more "undercoats" may be present, so that at least a portion of the first and/or the second coating layers are not in direct contact with the substrate (but rather with the undercoat). One or more "overcoats" may also be present, so that at least a portion of the first and/or second coating layers are not directly exposed to a gaseous stream or atmosphere (but rather are in contact with the overcoat).

The first and second coating layers may be in direct contact with each other without a "middle" overlapping zone. Alternatively, the first and second coating layers may not be in direct contact, with a "gap" between the two zones. In the case of an "undercoat" or "overcoat" the gap between the first and second SCR layer is termed an "interlayer."

An undercoat is a layer "under" a coating layer, an overcoat is a layer "over" a coating layer and an interlayer is a layer "between" two coating layers.

The interlayer(s), undercoat(s) and overcoat(s) may contain one or more catalysts or may be free of catalysts.

The present catalytic coatings may comprise more than one identical layers, for instance more than one first and/or second layers.

The simplest articles of the present invention comprise a flow-through substrate or a wall-flow filter having a first coating layer extending from the inlet end of the monolith or filter towards the outlet end and a second coating layer extending from the outlet end towards the inlet end.

Further disclosed is a SCR article comprising a substrate having a front upstream end and a rear downstream end defining an axial length, where the substrate is coated along the entire length with the second coating layer comprising the second copper-containing molecular sieve and where the first coating layer comprising the first copper-containing molecular sieve overlays a portion of the second coating layer and extends from the inlet end towards the outlet end 10%, 20%, 30%, 40%, 50%, 60%, 70% or 80% or the substrate length. In this instance, the concentration of copper in the first coating layer will advantageously be less than that of the second coating layer.

Also disclosed is a selective catalytic reduction article comprising a substrate having a front upstream end and a rear downstream end defining an axial length, where the substrate is coated along the entire length with the second coating layer comprising the second copper-containing molecular sieve and where the first coating layer comprising the first copper-containing molecular sieve overlays the entire second coating layer. In this instance also, the concentration of copper in the first coating layer will advantageously be less than that of the second coating layer.

The present catalytic coating, as well as each zone of a catalytic coating or any section of a coating, is present on the substrate at a loading (concentration) of for instance from about 0.3 g/in³ to about 4.5 g/in³ based on the substrate. This refers to dry solids weight per volume of substrate, for example per volume of a honeycomb monolith. The amount of base metal, i.e. copper, is only a portion of the catalytic coating, which also includes the molecular sieve. An amount of copper per volume would for instance be from about 0.2% to about 10% of the above values. An amount of copper per volume is the copper concentration. An amount of a copper-containing molecular sieve per volume is the molecular sieve concentration. Concentration is based on a cross-section of a substrate or on an entire substrate.

The term "catalytic article" refers to an element that is used to promote a desired reaction. The present catalytic articles comprise a substrate having a catalytic coating disposed thereon.

A system contains more than one article, for instance, a first SCR article and a second SCR article. A system may also comprise one or more articles containing a reductant injector, a diesel oxidation catalyst (DOC), a soot filter, an ammonia oxidation catalyst (AMOx) or a lean NOx trap (LNT).

An article containing a reductant injector is a reduction article. A reduction system includes a reductant injector and/or a pump and/or a reservoir, etc.

The present treatment system may further comprise a diesel oxidation catalyst and/or a soot filter and/or an ammonia oxidation catalyst. A soot filter may be uncatalyzed or may be catalyzed (CSF). For instance, the present treatment system may comprise, from upstream to downstream—an article containing a DOC, a CSF, an urea injector, the present zoned SCR article or a first SCR article and a second SCR article and an article containing an AMOx. A lean NOx trap (LNT) may also be included.

An undercoat layer comprising an AMOx catalyst may be present in the downstream zone of a substrate. For instance an AMOx undercoat layer may extend from the outlet end towards the inlet end about 10%, about 20%, about 30%, about 40%, about 50%, about 60%, about 70% or about 80% of the substrate length of a present article.

An AMOx undercoat layer may also be present on a second substrate of a second downstream article. This undercoat layer may extend the entire length of the second substrate or about 10%, about 20%, about 30%, about 40%, about 50%, about 60%, about 70%, about 80% or about 90% of the second substrate length.

AMOx catalysts are taught for instance in U.S. Pub. No. 2011/0271664. An ammonia oxidation (AMOx) catalyst may be a supported precious metal component which is effective to remove ammonia from an exhaust gas stream. The precious metal may include ruthenium, rhodium, iridium, palladium, platinum, silver or gold. For example, the precious metal component includes physical mixtures or chemical or atomically-doped combinations of precious metals. The precious metal component for instance includes platinum. Platinum may be present in an amount of from about 0.008% to about 2 wt % based on the AMOx catalyst.

The precious metal component is typically deposited on a high surface area refractory metal oxide support. Examples of suitable high surface area refractory metal oxides include alumina, silica, titania, ceria, and zirconia, as well as physical mixtures, chemical combinations and/or atomically-doped combinations thereof. In specific embodiments, the refractory metal oxide may contain a mixed oxide such as silica-alumina, amorphous or crystalline aluminosilicates, alumina-zirconia, alumina-lanthana, alumina-baria, alumina-ceria and the like. An exemplary refractory metal oxide comprises high surface area γ-alumina having a specific surface area of about 50 to about 300 $m^2/g$.

The AMOx catalyst may include a zeolitic or non-zeolitic molecular sieve for example selected from those of the CHA, FAU, BEA, MFI and MOR types. A molecular sieve may be physically mixed with an oxide-supported platinum component. In an alternative embodiment, platinum may be distributed on the external surface or in the channels, cavities or cages of the molecular sieve.

Present embodiments that include a first selective catalytic reduction article and a second selective catalytic reduction article may be referred to as a "multi-component" or "multi-brick" system. A "brick" may refer to a single article such as a monolith or filter.

Advantageously, articles of a multi-component system may each contain substrates containing zoned coatings as disclosed herein.

The catalytic articles are effective to catalyze the reduction of nitrogen oxides (NOx) in the presence of a reductant, for example ammonia or urea. In operation, the reductant is periodically metered into the exhaust stream from a position upstream of the SCR article. The injector is in fluid communication with and upstream of the SCR article. The injector will also be associated with a reductant reservoir and a pump.

Present articles, systems and methods are suitable for treatment of exhaust gas streams from mobile emissions sources such as trucks and automobiles. Articles, systems and methods are also suitable for treatment of exhaust streams from stationary sources such as power plants.

Ammonia is a typical reductant for SCR reactions for treating exhaust of stationary power plants while urea is the typical SCR reducing agent used for treatment of exhaust of mobile emissions sources. Urea decomposes to ammonia and carbon dioxide prior to contact with or on the SCR catalyst, where ammonia serves as the reducing agent for NOx.

The articles, systems and methods described herein can provide high $NO_x$ conversion. For example, a present catalytic article may exhibit an aged $NO_x$ conversion at 200° C. of at least 50%, at least 55% or at least 60% measured at a gas hourly space velocity of 80000 $h^{-1}$. A present catalytic article may exhibit an aged $NO_x$ conversion at 450° C. of at least 70%, at least 75% or at least 80% measured at a gas hourly volume-based space velocity of 80000 $h^{-1}$ under steady state conditions in a gas mixture of 500 ppm NO, 500 ppm $NH_3$, 10% $O_2$, 5% $H_2O$, balance $N_2$. The cores are hydrothermally aged in a tube furnace in a gas flow containing 10% $H_2O$, 10% $O_2$, balance $N_2$ for 5 hours at 750° C. Such SCR activity measurements are demonstrated in U.S. Pat. No. 8,404,203.

Further, articles, systems and methods herein may provide NOx conversion under transient HDD FTP conditions of ≥90% and also an $N_2O$ formation of ≤1.5%.

For example, some present selective catalytic reduction articles or systems are capable of providing NOx conversion of ≥90% and $N_2O$ formation of ≤40% compared to the NOx conversion and $N_2O$ formation of an article or system, respectively, containing a uniform concentration of CuCHA as the only SCR catalyst under transient engine testing conditions. An article containing a uniform concentration of CuCHA contains a catalytic coating comprising a CuCHA at a uniform concentration on the substrate; CuCHA is the only SCR catalyst present as a reference. Likewise, as a system reference, both substrates contain uniform concentrations of the same CuCHA as the only SCR catalyst.

That is, present articles and systems provide as good or better NOx conversion while forming less $N_2O$.

SCR performances such as the NO, conversion and $N_2O$ formation are for example measured at a gas hourly volume-based space velocity of 80000 $h^{-1}$ under pseudo-steady state conditions in a gas mixture of 500 ppm NO, (fast SCR condition: NO$_2$/NOx=0.5 or standard SCR conditions: NO$_2$/NOx=0), 500 ppm NH$_3$, 10% O$_2$, 5% H$_2$O, balance N$_2$ in a temperature ramp of 0.5° C./min from 200° C. to 600° C.

NOx conversion is defined as mol % conversion of NO and NO$_2$ combined. A high value is desired. N$_2$O formation is defined as mol % conversion of NO and NO$_2$ combined to N$_2$O. A low value is desired. Percent conversion of NOx to N$_2$O is calculated based on the assumption that each molecule of N$_2$O is derived from one molecule of NOx and one molecule of NH$_3$.

Present selective catalytic reduction articles or systems or methods are for example capable of providing >90% total NOx conversion where the front upstream zone provides from about 30% to about 80% of the total NOx conversion, for example measured under transient HDD FTP conditions.

Exemplary embodiments of the invention are shown below. It is understood that the embodiments are provided as examples, and further combinations of catalytic coatings are encompassed. Further, as exemplified, coating zones and coating layers may be interchangeable in that a coating layer may define a coating zone.

Figure 4A:
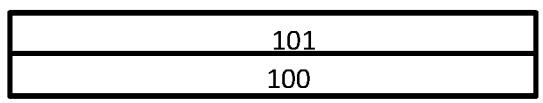
FIG. 4a-FIG. 4j are partial cross-sections showing coating layers and/or coating zones on one or more substrates according to exemplary embodiments of the present disclosure.

In one embodiment, as seen in FIG. 4a, a substrate 100 can be coated with a single coating layer 101 that is a combination of multiple catalytically active molecular sieves. For example, the single coating 101 can be a combination of a copper-containing molecular sieve in a low copper concentration (e.g., about 0.1 to about 3 wt % copper), and a copper-containing molecular sieve in a high copper concentration (e.g., about 3 to about 10 wt %).

Figure 4B:
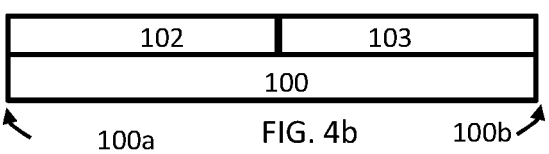

In a further embodiment, a substrate 100 can be coated with two non-overlapping zones. As seen in FIG. 4b, a first zone 102 proximate to the front or inlet end 100a of the substrate 100 can comprise copper-containing molecular sieve in a low copper concentration (e.g., about 0.1 to about 3 wt % copper). A second zone 103 proximate to the rear or outlet end 100b of the substrate 100 can comprise copper-containing molecular sieve, preferably at a high copper concentration (e.g., about 3 to about 10 wt %).

Figure 4C:
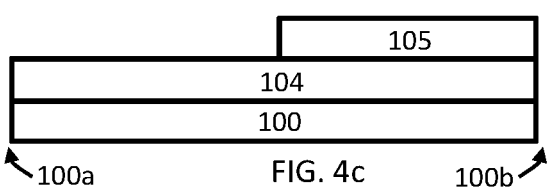

In a further embodiment, As seen in FIG. 4c, a substrate 100 can be coated with a first coating layer 104 extending from the front or inlet end 100a of the substrate 100 to the rear or outlet end 100b of the substrate 100 and a second coating layer 105 that is coated over the first coating layer 104 proximate to the rear or outlet end 100b of the substrate 100 and extending across only a partial length of the substrate 100 (i.e., terminating before reaching the front or inlet end 100a of the substrate 100). The first layer 104 can comprise copper-containing molecular sieve in a low copper concentration (e.g., about 0.1 to about 3 wt % copper). The second layer 105 can comprise copper-containing molecular sieve, preferably at a high copper concentration (e.g., about 3 to about 10 wt %).

Figure 4D:
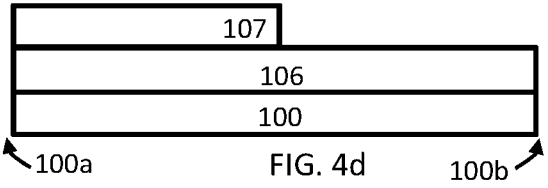

In still a further embodiment, as seen in FIG. 4d, a substrate 100 can be coated with a first coating layer 106 extending from the front or inlet end 100a of the substrate 100 to the rear or outlet end 100b of the substrate 100 and a second coating layer 107 that is coated over the first coating layer 106 proximate to the front or inlet end 100a of the substrate 100 and extending across only a partial length of the substrate 100 (i.e., terminating before reaching the rear or outlet end 100b of the substrate 100). The first coating layer 106 can comprise copper-containing molecular sieve, preferably at a high copper concentration (e.g., about 3 to about 10 wt %). The second coating layer 107 can comprise copper-containing molecular sieve in a low copper concentration (e.g., about 0.1 to about 3 wt % copper).

Figure 4E:
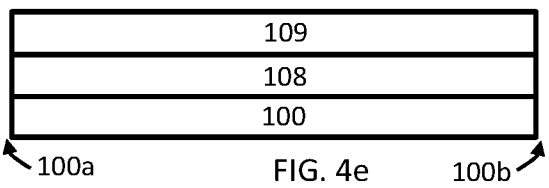

In another embodiment, as seen in FIG. 4e, a substrate 100 can be coated with a first coating layer 108 extending from the front or inlet end 100a of the substrate 100 to the rear or outlet end 100b of the substrate 100 and a second coating layer 109 that is coated over the first coating layer 108 also extending from the front or inlet end 100a of the substrate 100 to the rear or outlet end 100b of the substrate 100. The first coating layer 108 can comprise copper-containing molecular sieve, preferably at a high copper concentration (e.g., about 3 to about 10 wt %). The second coating layer 109 can comprise copper-containing molecular sieve in a low copper concentration (e.g., about 0.1 to about 3 wt % copper).

Figure 4F:
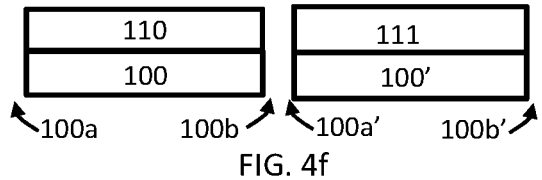

In yet another embodiment, as seen in FIG. 4f, a first substrate 100 can be coated with a first coating layer 110, and a second, separate substrate 100' can be coated with a second coating layer 111. The first coating layer 110 on the first substrate 100 can comprise copper-containing molecular sieve in a low copper concentration (e.g., about 0.1 to about 3 wt % copper). The second coating layer 111 on the second, separate substrate 100' can comprise copper-containing molecular sieve, preferably at a high copper concentration (e.g., about 3 to about 10 wt %). The first substrate 100 is upstream from the second, separate substrate 100' relative to the flow path of an exhaust stream. The first coating layer 110 can extend from a front or inlet end 100a to a rear or outlet end 100b of the first substrate 100, and the second coating layer 111 can extend from a front or inlet end 100a' to a rear or outlet end 100b' of the second substrate 100'.

Figure 4G:
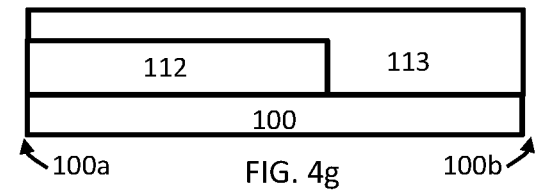
Figure 4H:
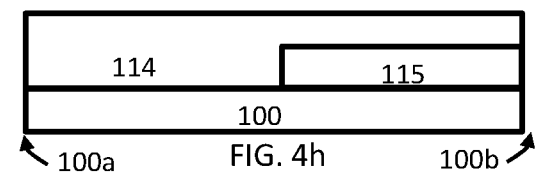
Figure 4I:
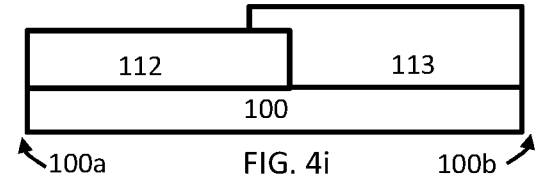

In a further embodiment, as seen in FIG. 4g and FIG. 4i, a substrate 100 can be coated with a first coating layer 112 proximate to the front or inlet end 100a of the substrate 100 and extending only partially along the length of the substrate 100 (i.e., terminating before reaching the rear or outlet end 100b of the substrate 100). The substrate 100 can be coated with a second coating layer 113. As seen in FIG. 4g, the second coating layer 113 extends from the front or inlet end 100a of the substrate 100 to the rear or outlet end 100b of the substrate 100 (and thus is coated completely over the first coating layer 112). As seen in FIG. 4i, the second coating layer 113 extends from the rear or outlet end 100b of the substrate 100 only a partial length toward the front or inlet end 100a of the substrate 100 to a point so that the second coating layer 113 is coated over a portion of the substrate 100 and also over a portion of the first coating layer 112. The first coating layer 112 on the substrate 100 can comprise copper-containing molecular sieve in a low copper concentration (e.g., about 0.1 to about 3 wt % copper). The second coating layer 113 on the substrate 100 can comprise copper-containing molecular sieve, preferably at a high copper concentration (e.g., about 3 to about 10 wt %). As described above, the second coating layer 113 can partially cover the first coating layer 112 or completely cover the first coating layer 112.

Figure 4J:
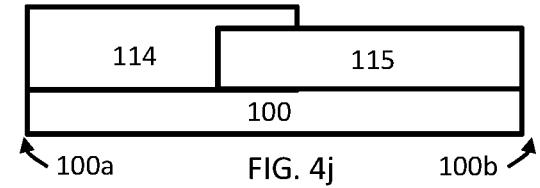

In an additional embodiment, as seen in FIG. 4h and FIG. 4j, a substrate 100 can be coated with a first coating layer 115 proximate to the rear or outlet end 100b of the substrate 100 and extending only partially along the length of the substrate 100 (i.e., terminating before reaching the front or inlet end 100a of the substrate 100). The substrate 100 can be coated with a second coating layer 114. As seen in FIG. 4h, the second coating layer 114 extends from the front or inlet end 100a of the substrate 100 to the rear or outlet end 100b of the substrate 100 (and thus is coated completely over the first coating layer 115). As seen in FIG. 4j, the second coating layer 114 extends from the front or inlet end 100a of the substrate 100 only a partial length toward the rear or outlet end 100b of the substrate 100 to a point so that the second coating layer 114 is coated over a portion of the substrate 100 and also over a portion of the first coating layer 115. The first coating layer 115 on the substrate 100 can comprise copper-containing molecular sieve in a low copper concentration (e.g., about 0.1 to about 3 wt % copper). The second coating layer 114 on the substrate 100 can comprise copper-containing molecular sieve, preferably at a high copper concentration (e.g., about 3 to about 10 wt %). As described above, second coating layer 114 can partially cover the first coating layer 115 or completely cover the first coating layer 115.

"Platinum group metal components" refer to platinum group metals or one of their oxides. "Rare earth metal components" refer to one or more oxides of the lanthanum series defined in the Periodic Table of Elements, including lanthanum, cerium, praseodymium and neodymium.

"Substantially free" means for instance "little or no", for instance, means "no intentionally added" and having only trace and/or inadvertent amounts. For instance, it means less than 2 wt % (weight %), less than 1.5 wt %, less than 1.0 wt %, less than 0.5 wt %, 0.25 wt % or less than 0.01 wt %, based on the weight of the indicated total composition.

"Substantially all" means for example at least 90% at least 91%, at least 92%, at least 93%, at least 94%, at least 95%, at least 96%, at least 97%, at least 98%, at least 99% or at least 99.5%, by weight or by number.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

Unless otherwise indicated, all parts and percentages are by weight. Weight percent (wt %), if not otherwise indicated, is based on an entire composition free of any volatiles, that is, based on dry solids content.

All U.S. patent applications, published patent applications and patents referred to herein are hereby incorporated by reference.

EXAMPLE 1

SCR Articles, Preparation and Testing

Catalytic coatings containing CuCHA zeolite are disposed via a washcoat process on cellular ceramic monoliths having a cell density of 400 cpsi and a wall thickness of 6 mil. The coated monoliths are dried at 110° C. and calcined at about 450° C. for 1 hour. The coating process provides a catalyst loading of 3 g/in$^3$. The front and rear zones are of equal coating volume. All samples are hydrothermally aged in the presence of 10% H$_2$O/air at 750° C. for 5 hours. The front zone extends from the inlet end of the core to about 50% of the length and the rear zone extends from the outlet end of the core to about 50% of the length of the core. Reference samples have uniform coatings.

SCR testing of aged samples is performed in HDD FTP (Heavy Duty Diesel US Federal Test Procedure) cycle conditions. The transient temperature of the HDD FTP test ranges from 225° C. and 325° C. The cumulative inlet NOx per cycle (1200 sec) is 5 g/L. The transient space velocity ranges from 20K to 120K hr$^{-1}$. Reported are HDD FTP NOx conversion and N$_2$O formation results. Front and rear zone copper is weight %, based on the total weight of the zeolite. Weight percent Cu is reported as CuO.

NOx conversion is defined as mol % conversion of NO and NO$_2$ combined. A high value is desired. N$_2$O formation is defined as mol % conversion of NO and NO$_2$ combined to N$_2$O. A low value is desired. Percent conversion of NOx to N$_2$O is calculated based on the assumption that each molecule of N$_2$O is derived from one molecule of NOx and one molecule of NH$_3$.

Reference Comparative Examples with Equal Front and Rear Cu Loadings

| | front zone Cu (wt %) | rear zone Cu (wt %) | NOx conversion (%) | N$_2$O formation (%) |
|---|---|---|---|---|
| ref1) | 0.6 | 0.6 | 86.6 | 1.0 |
| ref2) | 1.2 | 1.2 | 91.1 | 1.7 |
| ref3) | 2.3 | 2.3 | 93.8 | 2.5 |
| ref4) | 2.7 | 2.7 | 94.4 | 2.8 |
| ref5) | 3.4 | 3.4 | 93.8 | 3.0 |

Inventive Zoned CuCHA/CuCHA with Different Front and Rear Cu Loadings

| | front zone Cu (wt %) | rear zone Cu (wt %) | NOx conversion (%) | N$_2$O formation (%) |
|---|---|---|---|---|
| 1a) | 0.6 | 1.2 | 91.6 | 1.0 |
| 1b) | 0.6 | 2.3 | 93.6 | 1.1 |
| 1c) | 0.6 | 2.7 | 94.4 | 1.5 |
| 1d) | 0.6 | 3.4 | 94.4 | 1.3 |
| 1e) | 1.2 | 2.3 | 94.6 | 1.8 |
| 1f) | 1.2 | 2.7 | 92.0 | 1.8 |
| 1g) | 1.2 | 3.4 | 93.6 | 1.8 |
| 1h) | 2.3 | 2.7 | 95.7 | 2.3 |
| 1i) | 2.3 | 3.4 | 92.9 | 2.5 |
| 1j) | 2.7 | 3.4 | 92.7 | 2.8 |

It is seen that inventive samples 1a-1j exhibit excellent NOx conversion (>91%) while reducing N$_2$O formation compared to the reference samples resulting in overall better performance. To achieve NOx conversion of 93-95%, uniform copper loadings result in N$_2$O formation of from 2.5 to 3.0, while the present zoned copper substrates result in N$_2$O formation of from 1.1% to 1.8%. Inventive samples 1b-1g achieve an NOx conversion of at least 92% and a maximum N$_2$O formation of 1.8%.

The invention claimed is:

1. A selective catalytic reduction article comprising a substrate having a front upstream end and a rear downstream end defining a length of the substrate and having a catalytic coating thereon, wherein the catalytic coating comprises:
   a first coating layer comprising a first copper-containing molecular sieve; and
   a second, different coating layer comprising a second copper-containing molecular sieve;
   wherein the first copper-containing molecular sieve comprises copper oxide in an amount of about 0.1 wt. % to about 3 wt % based on a total weight of the molecular sieve, the second copper-containing molecular sieve comprises copper oxide in an amount based on a total weight of the molecular sieve, and the amount of copper oxide comprised by the first copper-containing molecular sieve is less than the amount of copper oxide comprised by the second copper-containing molecular sieve;

wherein the selective catalytic reduction article exhibits a NOx conversion greater than or equal to 92% and a N2O formation less than or equal to 2% when subjected to Heavy Duty Diesel US Federal Test Procedure cycle conditions; and wherein the first copper-containing molecular sieve has a silica to alumina ratio equal to that of the second copper-containing molecular sieve; and wherein a ratio of the amount of copper oxide in the first copper-containing molecular sieve to the amount of copper oxide in the second copper-containing molecular sieve ranges from 0.6:3.4 to 2.3:2.7.

2. The selective catalytic reduction article of claim 1, wherein the catalytic coating is zoned and comprises:

a first zone including the first coating layer comprising the first copper-containing molecular sieve; and a second zone including the second coating layer comprising the second, different copper-containing molecular sieve;

wherein the first zone is upstream of the second zone.

3. The selective catalytic reduction article of claim 2, wherein the copper oxide concentration of the first copper-containing molecular sieve is less than or equal to the copper oxide concentration of the second, different copper-containing molecular sieve in the second zone.

4. The selective catalytic reduction article of claim 1, wherein the substrate is a porous wall-flow filter or a flow-through monolith.

5. The selective catalytic reduction article of claim 1, wherein the second copper-containing molecular sieve comprises copper oxide in an amount of about 3 to about 10 wt %, based on the total weight of the molecular sieve.

6. The selective catalytic reduction article claim 1, wherein the first copper-containing molecular sieve comprises copper oxide in an amount of about 1 to about 2.5 wt % based on the total weight of the molecular sieve, and the second copper-containing molecular sieve comprises copper oxide in an amount of about 3 to about 6 wt %, based on the total weight of the molecular sieve.

7. The selective catalytic reduction article of claim 1, wherein a Cu/Al atomic ratio for each of the first copper-containing molecular sieve and the second copper-containing molecular sieve is independently about 0.05 to about 0.55, and wherein the Cu/Al atomic ratio of the first copper-containing molecular sieve is less than the Cu/Al atomic ratio of the second copper-containing molecular sieve.

8. The selective catalytic reduction article of claim 1, wherein the first coating layer extends a distance from the front, upstream end of the substrate towards the rear, downstream end of the substrate and overlays a portion of the second coating layer, which extends from the rear, downstream end of the substrate a distance towards the front, upstream end of the substrate.

9. The selective catalytic reduction article of claim 1, wherein the first coating layer extends a distance from the front, upstream end of the substrate to the rear, downstream end of the substrate and overlays an entirety of the second coating layer, which extends from the rear, downstream end of the substrate to the front, upstream end of the substrate.

10. The selective catalytic reduction article of claim 1, wherein the second coating layer extends a distance from the front, upstream end of the substrate towards the rear, downstream end of the substrate and overlays a portion of the first coating layer, which extends a distance from the rear, downstream end of the substrate towards the front, upstream end of the substrate.

11. The selective catalytic reduction article of claim 1, wherein the second coating layer extends from the front, upstream end of the substrate to the rear, downstream end of the substrate and overlays an entirety of the first coating layer, which extends from the rear, downstream end of the substrate to the front, upstream end of the substrate.

12. The selective catalytic reduction article of claim 1, wherein the first coating layer and the second coating layer are adjacent and do not overlay each other.

13. The selective catalytic reduction article of claim 1, wherein the first coating layer and the second coating layer are in direct contact with each other.

14. The selective catalytic reduction article of claim 1, wherein the first copper-containing molecular sieve and the second copper-containing molecular sieves are each 8-ring small pore molecular sieves.

15. The selective catalytic reduction article of claim 14, wherein the first copper-containing molecular sieve and the second copper-containing molecular sieve are both each independently zeolites having a structure selected from the group consisting of AEI, AFT, AFX, CHA, EAB, ERI, KFI, LEV, SAS, SAT and SAV.

16. The selective catalytic reduction article of claim 14, wherein each of the first copper-containing molecular sieve and the second copper-containing molecular sieve are aluminosilicate zeolites having a CHA crystal structure and a silica to alumina ratio (SAR) of about 5 to about 40.

17. The selective catalytic reduction article of claim 1, wherein the substrate includes an undercoat comprising an ammonia oxidation catalyst (AMOx) in the second zone.

18. A selective catalytic reduction system comprising:

a first selective catalytic reduction article according to claim 1; and a second selective catalytic reduction article comprising a second substrate including a catalytic coating layer comprising a copper-containing molecular sieve;

wherein the first selective catalytic reduction article and the second selective catalytic reduction article are in fluid communication.

19. The selective catalytic reduction system of claim 18, wherein the substrate of the first selective catalytic reduction article and the second substrate are each independently chosen from a porous wall-flow filter and a flow-through monolith.

20. The selective catalytic reduction system of claim 18, wherein the second substrate includes an undercoat comprising an ammonia oxidation catalyst (AMOx).

21. An exhaust gas treatment system comprising:

a selective catalytic reduction article according to claim 1; and a reductant injector in fluid communication with and upstream of the selective catalytic reduction article; and optionally one or more of a diesel oxidation catalyst, a soot filter, an ammonia oxidation catalyst, and an internal combustion engine.

22. A method for treating an exhaust stream containing NOx, comprising passing an exhaust stream through a selective catalytic reduction article according to claim 1.

23. An exhaust gas treatment system comprising:

a selective catalytic reduction system according to claim 18;

a reductant injector in fluid communication with and upstream of the selective catalytic reduction system; and optionally one or more of a diesel oxidation catalyst, a soot filter, an ammonia oxidation catalyst, and an internal combustion engine.

24. A method for treating an exhaust stream containing NOx, comprising passing an exhaust stream through a selective catalytic reduction system according to claim 18.

25. A method for treating an exhaust stream containing NOx, comprising passing an exhaust stream through an exhaust gas treatment system according to claim 21.

26. A method for treating an exhaust stream containing NOx, comprising passing an exhaust stream through an exhaust gas treatment system according to claim 23.

27. The selective catalytic reduction article of claim 1, wherein the second copper-containing molecular sieve comprises copper oxide in an amount of about 1 wt % to about 5 wt % based on a total weight of the molecular sieve.

* * * * *